(12) United States Patent
Filardo (10) Patent No.: US 10,823,136 B2
(45) Date of Patent: Nov. 3, 2020

(54) APPARATUSES, METHODS AND SYSTEMS FOR HARNESSING THE ENERGY OF FLUID FLOW TO GENERATE ELECTRICITY OR PUMP FLUID

(71) Applicant: Pliant Energy Systems LLC, Brooklyn, NY (US)

(72) Inventor: Benjamin Pietro Filardo, New York, NY (US)

(73) Assignee: Pliant Energy Systems LLC, Brooklyn, NY (US)

(*) Notice: Subject to any disclaimer, the term of this patent is extended or adjusted under 35 U.S.C. 154(b) by 3 days.

(21) Appl. No.: 16/396,587

(22) Filed: Apr. 26, 2019

(65) Prior Publication Data
US 2019/0331090 A1 Oct. 31, 2019

Related U.S. Application Data

(60) Provisional application No. 62/664,003, filed on Apr. 27, 2018.

(51) Int. Cl.
| | | |
|---|---|---|
| F03B 17/06 | (2006.01) | |
| F04B 43/113 | (2006.01) | |
| F03B 13/10 | (2006.01) | |

(52) U.S. Cl.
CPC ........ F03B 17/061 (2013.01); F04B 43/1136 (2013.01); F03B 13/10 (2013.01);
(Continued)

(58) Field of Classification Search
CPC .. F03B 17/061; F03B 13/10; F05B 2240/311; F05B 2240/40; F05B 2260/4021; F05B 2260/406
See application file for complete search history.

(56) References Cited

U.S. PATENT DOCUMENTS

| | | | |
|---|---|---|---|
| 3,353,787 A | 11/1967 | Semo | |
| 3,961,863 A | 6/1976 | Hooper, III | |
| | (Continued) | | |

FOREIGN PATENT DOCUMENTS

| | | |
|---|---|---|
| CN | 101021199 | 8/2007 |
| CN | 101605986 | 12/2009 |
| | (Continued) | |

OTHER PUBLICATIONS

International Search Report and the Written Opinion of the International Search Authority; PCT/US19/29499; dated Jul. 9, 2019; entire document.

*Primary Examiner* — Tulsidas C Patel
*Assistant Examiner* — Joseph Ortega
(74) *Attorney, Agent, or Firm* — Irell & Manella, LLP (57) ABSTRACT

The APPARATUSES, METHODS AND SYSTEMS FOR HARNESSING THE ENERGY OF FLUID FLOW TO GENERATE ELECTRICITY OR PUMP FLUID include a device which, when placed in fluid-flow, harnesses the kinetic energy of the flow to generate electricity or to perform useful mechanical work such as pumping. For example, the undulating mechanical action of traveling waves along flexible fins may be harnessed by summing the varying speeds and torques along the fins into a unified circulatory system for power take-off or fluid extraction. The device may include two fins, a chassis, and bellows/pistons/rotary vanes and the like which are connected via a circulatory system of tubes or conduits.

33 Claims, 10 Drawing Sheets

(52) U.S. Cl.
CPC ..... *F05B 2240/311* (2013.01); *F05B 2240/40* (2013.01); *F05B 2260/406* (2013.01); *F05B 2260/4021* (2013.01)

(56) References Cited

U.S. PATENT DOCUMENTS

| | | | |
|---|---|---|---|
| 4,717,832 A | 1/1988 | Harris | |
| 4,742,241 A | 5/1988 | Melvin | |
| 4,781,023 A | 11/1988 | Gordon | |
| 7,696,634 B2* | 4/2010 | Filardo | F03B 17/06 290/43 |
| 7,823,380 B2 | 11/2010 | Ghouse | |
| 7,872,363 B2 | 1/2011 | Morse | |
| 8,358,025 B2* | 1/2013 | Hogmoe | F03B 13/1815 290/53 |
| 8,432,057 B2* | 4/2013 | Filardo | F03B 13/188 290/54 |
| 8,610,304 B2* | 12/2013 | Filardo | B63H 1/37 290/54 |
| 8,629,572 B1* | 1/2014 | Phillips | F03B 13/16 290/53 |
| 8,912,677 B2 | 12/2014 | Dehlsen et al. | |
| 8,961,131 B2 | 2/2015 | Trayner et al. | |
| 9,032,900 B2 | 5/2015 | Glezer et al. | |
| 9,145,875 B2* | 9/2015 | Filardo | H02N 2/18 |
| 9,683,538 B2 | 6/2017 | Drevet | |
| 9,777,701 B2 | 10/2017 | Alam et al. | |
| 10,060,406 B2* | 8/2018 | Filardo | F03B 13/10 |
| 10,190,570 B1* | 1/2019 | Filardo | F03B 17/06 |
| 10,519,926 B2* | 12/2019 | Filardo | B63H 1/37 |
| 10,590,906 B2* | 3/2020 | Espinosa | F03B 17/06 |
| 2007/0079997 A1 | 4/2007 | Chan et al. | |
| 2009/0121489 A1* | 5/2009 | Kawai | H02N 2/185 290/55 |
| 2010/0026003 A1* | 2/2010 | Filardo | F03B 17/06 290/54 |
| 2010/0078941 A1* | 4/2010 | Filardo | F03B 13/188 290/52 |
| 2010/0209236 A1* | 8/2010 | Freeman | F01D 5/145 415/208.1 |
| 2010/0295417 A1 | 11/2010 | Wood et al. | |
| 2011/0006532 A1* | 1/2011 | Grey | F03B 13/20 290/53 |
| 2011/0057448 A1 | 3/2011 | Page | |
| 2011/0150667 A1* | 6/2011 | Bernstein | F04B 9/10 417/50 |
| 2011/0204643 A1* | 8/2011 | Von Bulow | F03B 13/185 290/53 |
| 2011/0280755 A1* | 11/2011 | Wackerle | F04B 23/06 417/559 |
| 2011/0296825 A1 | 12/2011 | Boltz et al. | |
| 2011/0304144 A1 | 12/2011 | Dehlsen et al. | |
| 2012/0117960 A1* | 5/2012 | Browne | F03B 17/061 60/495 |
| 2012/0175880 A1* | 7/2012 | Filardo | F03B 17/06 290/54 |
| 2012/0299303 A1* | 11/2012 | Bellamy | F03B 13/188 290/53 |
| 2014/0015378 A1* | 1/2014 | Filardo | F04B 9/08 310/339 |
| 2014/0023481 A1* | 1/2014 | Drevet | F03B 5/00 415/90 |
| 2014/0219799 A1* | 8/2014 | Selsam | F03D 15/20 416/11 |
| 2014/0240916 A1* | 8/2014 | Daidzic | G06F 1/20 361/679.46 |
| 2015/0017023 A1* | 1/2015 | Huang | F04B 19/006 417/53 |
| 2015/0260181 A1* | 9/2015 | Harvey | F04B 45/043 417/410.1 |
| 2016/0061180 A1* | 3/2016 | Eavis | F03B 13/20 290/53 |
| 2016/0208767 A1* | 7/2016 | Drevet | H02K 35/00 |
| 2017/0016424 A1* | 1/2017 | Filardo | F03B 13/10 |
| 2017/0356478 A1* | 12/2017 | Guest | F15D 1/12 |
| 2018/0030954 A1* | 2/2018 | Dayson | H02N 2/18 |
| 2019/0178224 A1* | 6/2019 | Saiz | F03B 13/12 |
| 2019/0326906 A1* | 10/2019 | Camacho Cardenas | F04B 17/03 |

FOREIGN PATENT DOCUMENTS

| | | |
|---|---|---|
| CN | 101639028 | 2/2010 |
| CN | 101936249 | 1/2011 |
| CN | 102384013 | 3/2012 |
| CN | 103213665 | 7/2013 |
| CN | 104816808 | 8/2015 |
| CN | 204627835 | 9/2015 |
| CN | 106523257 | 3/2017 |
| CN | 105134473 | 11/2017 |
| CN | 107642454 | 1/2018 |
| CN | 207004721 | 2/2018 |
| CN | 108111094 | 6/2018 |
| DE | 2809300 | 9/1979 |
| DE | 102008050238 | 4/2010 |
| DE | 102009047232 | 6/2011 |
| DE | 102016013425 | 5/2018 |
| EP | 1292765 | 6/2005 |
| EP | 3039284 | 1/2018 |
| GB | 2036190 | 6/1980 |
| GB | 2467907 | 8/2010 |
| IN | 44/2017 | 11/2017 |
| JP | 2012-237278 | 12/2012 |
| JP | 5604310 | 8/2014 |
| TW | M505544 | 7/2015 |
| WO | 2008/091208 | 7/2008 |
| WO | 2009/093988 | 7/2009 |
| WO | 2011/103960 | 9/2011 |
| WO | 2012/123465 | 9/2012 |
| WO | 2013/017400 | 2/2013 |
| WO | 2016/110744 | 7/2016 |
| WO | 2017/145150 | 8/2017 |

* cited by examiner

APPARATUSES, METHODS AND SYSTEMS FOR HARNESSING THE ENERGY OF FLUID FLOW TO GENERATE ELECTRICITY OR PUMP FLUID

PRIORITY CLAIM

This application is a Non-Provisional and claims priority under 35 U.S.C. § 119 to prior U.S. provisional application Ser. No. 62/664,003 filed Apr. 27, 2018 entitled, "UNDULATING MECHANISMS FOR HARNESSING THE ENERGY OF FLUID FLOW TO GENERATE ELECTRICITY OR PUMP FLUID". The entire contents of the aforementioned applications are incorporated in their entirety herein by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address energy conversion, and more particularly, include APPARATUSES, METHODS AND SYSTEMS FOR HARNESSING THE ENERGY OF FLUID FLOW TO GENERATE ELECTRICITY OR PUMP FLUID.

BACKGROUND

The kinetic energy of a moving current of fluid has been harnessed by mankind for thousands of years. The first such mechanisms were used to perform kinetic energy intensive tasks such as grinding grain or raising water from a river. Since the invention of the electromagnetic generator, this kinetic energy of moving fluid has been converted into electrical energy, for distribution and consumption by all manner of electrical energy-powered devices.

The raising of water from a river to a higher elevation for human consumption or for the irrigation of fields is one of the oldest recorded uses of hydrokinetic energy. One such ancient mechanism is known as a noria, in which jugs or buckets are fixed to a water wheel. The jugs fill when submerged, and then empty into an aqueduct near the uppermost position along the wheel's rotation. In such a device, the river provides both the water and the energy required to move the water to a desired location.

Other methods for moving water have been developed over the centuries such as the hydraulic ram and wind-powered pumps, but today pumps powered by an electric motor or internal combustion engine usually perform such functions.

SUMMARY

The APPARATUSES, METHODS AND SYSTEMS FOR HARNESSING THE ENERGY OF FLUID FLOW TO GENERATE ELECTRICITY OR PUMP FLUID include a device which, when placed in fluid-flow, harnesses the kinetic energy of the flow to generate electricity or to perform useful mechanical work such as pumping. For example, the undulating mechanical action of traveling waves along flexible fins may be harnessed by summing the varying speeds and torques along the fins into a unified circulatory system for power take-off or fluid extraction. The device may include two fins, a chassis, and pump device (e.g., bellows, pistons, rotary vanes, and/or the like) which are connected via a circulatory system of tubes or conduits. Induced by traveling waves along the paired fins, the traveling regions of partial rotation along the two coupled fins exert antagonistic forces that either expand or contract pump device (e.g., bellows, pistons, rotary vanes, and/or the like) and the like, to create fluid volume changes, pressure changes and fluid circulation inside the device. For pump implementations, such as for pumping water from a river, ambient water is drawn into the circulatory system of the device and forced out through an exit conduit. For generator implementations, entrapped fluid inside the circulatory system of the device is circulated through a closed loop system into which is placed a turbine or other transducer capable of converting fluid-flow into electrical energy. Check valves at either end of the bellows/pistons/rotary vanes and the like maintain directional fluid-flow within the circulatory system of the device.

In one embodiment, a mechanism, is disclosed comprising: a pump device having a left side and a right side; a first articulated coupling component rotationally coupled at a first end to the left side of the pump device and rotationally coupled at a second end to a common frame; a second articulated coupling component rotationally coupled at a first end to the right side of the pump device and rotationally coupled at a second end to the common frame; a first flexible fin connected at an inner first edge to the second end of the first articulated coupling component; a second flexible fin connected at an inner second edge to the second end of the second articulated coupling component; and a conduit in fluid communication with the pump device, wherein oscillations of the first and second flexible fins caused by a flowing fluid induce expansion and contraction of the pump device to pump fluid in the conduit.

In another embodiment, a mechanism is disclosed, comprising: a plurality of pump devices arranged between arms of a common frame, each having a left side and a right side; a plurality of first articulated coupling components, each rotationally coupled at a first end to the left side of one of the plurality of pump devices and rotationally coupled at a second end to a left arm of the common frame; a plurality of second articulated coupling components, each rotationally coupled at a first end to the right side of one of the plurality of pump devices and rotationally coupled at a second end to a right arm of the common frame; a first crenated strip connected at an inner first edge to the second end of each of the plurality of first articulated coupling components; a second crenated strip connected at an inner second edge to the second end of each of the plurality of second articulated coupling components; a hydraulic hose in fluid communication with the plurality of pump devices, wherein each of the first and second crenated strips have persistent deformations therein maintained by the common frame and wherein oscillations of the persistent deformations of the first and second crenated strips caused by a flowing fluid induce expansion and contraction of the plurality of pump devices to pump fluid in the hydraulic hose; a plurality of left and right check valves, each left check valve adjacent to a left side of one of the plurality of pump devices and each right check valve adjacent to a right side of one of the plurality of pump devices, the plurality of left and right check valves configured to restrict a direction of the pumped fluid in the hydraulic hose; a turbine connected to the hydraulic hose, wherein the pumped fluid induces a torque load on the turbine; a generator coupled to the turbine and configured to convert rotation of the turbine in response to the torque load into electricity; and a gear box inserted between an output shaft of the turbine and an input shaft of the generator.

In another embodiment, a method, comprising: placing a pump device having a left side and a right side between left and right arms of a common frame; rotationally coupling a first articulated component at a first end to the left side of the pump device; rotationally coupling the first articulated component at a second end to the left arm of the common frame; rotationally coupling a second articulated component at a first end to the right side of the pump device; rotationally coupling the second articulated component at a second end to the right arm of the common frame; connecting a first flexible fin at an inner first edge to the second end of the first articulated coupling component; connecting a second flexible fin at an inner second edge to the second end of the second articulated coupling component; and connecting a conduit in fluid communication with the pump device, wherein oscillations of the first and second flexible fins caused by a flowing fluid induce expansion and contraction of the pump device to pump fluid in the conduit.

In another embodiment, a mechanism is disclosed, comprising: a bellows having a left side and a right side; a first articulated coupling component rotationally coupled at a first end to the left side of the bellows and rotationally coupled at a second end to a common frame; a second articulated coupling component rotationally coupled at a first end to the right side of the bellows and rotationally coupled at a second end to the common frame; a first flexible fin connected at an inner first edge to the second end of the first articulated coupling component; a second flexible fin connected at an inner second edge to the second end of the second articulated coupling component; and a conduit in fluid communication with the bellows, wherein oscillations of the first and second flexible fins caused by a flowing fluid induce expansion and contraction of the bellows to pump fluid in the conduit.

In another embodiment, a mechanism is disclosed, comprising: a plurality of bellows arranged between arms of a common frame, each having a left side and a right side; a plurality of first articulated coupling components, each rotationally coupled at a first end to the left side of one of the plurality of bellows and rotationally coupled at a second end to a left arm of the common frame; a plurality of second articulated coupling components, each rotationally coupled at a first end to the right side of one of the plurality of bellows and rotationally coupled at a second end to a right arm of the common frame; a first crenated strip connected at an inner first edge to the second end of each of the plurality of first articulated coupling components; a second crenated strip connected at an inner second edge to the second end of each of the plurality of second articulated coupling components; a hydraulic hose in fluid communication with the plurality of bellows, wherein each of the first and second crenated strips have persistent deformations therein maintained by the common frame and wherein oscillations of the persistent deformations of the first and second crenated strips caused by a flowing fluid induce expansion and contraction of the plurality of bellows to pump fluid in the hydraulic hose; a plurality of left and right check valves, each left check valve adjacent to a left side of one of the plurality of bellows and each right check valve adjacent to a right side of one of the plurality of bellows, the plurality of left and right check valves configured to restrict a direction of the pumped fluid in the hydraulic hose; a turbine connected to the hydraulic hose, wherein the pumped fluid induces a torque load on the turbine; a generator coupled to the turbine and configured to convert rotation of the turbine in response to the torque load into electricity; and a gear box inserted between an output shaft of the turbine and an input shaft of the generator.

In another embodiment, a method is disclosed, comprising: placing a bellows having a left side and a right side between left and right arms of a common frame; rotationally coupling a first articulated component at a first end to the left side of the bellows; rotationally coupling the first articulated component at a second end to the left arm of the common frame; rotationally coupling a second articulated component at a first end to the right side of the bellows; rotationally coupling the second articulated component at a second end to the right arm of the common frame; connecting a first flexible fin at an inner first edge to the second end of the first articulated coupling component; connecting a second flexible fin at an inner second edge to the second end of the second articulated coupling component; and connecting a conduit in fluid communication with the bellows, wherein oscillations of the first and second flexible fins caused by a flowing fluid induce expansion and contraction of the bellows to pump fluid in the conduit.

BRIEF DESCRIPTION OF THE DRAWINGS

The accompanying appendices and/or drawings illustrate various non-limiting, example, innovative aspects in accordance with the present descriptions.

DETAILED DESCRIPTION

Figure 1:
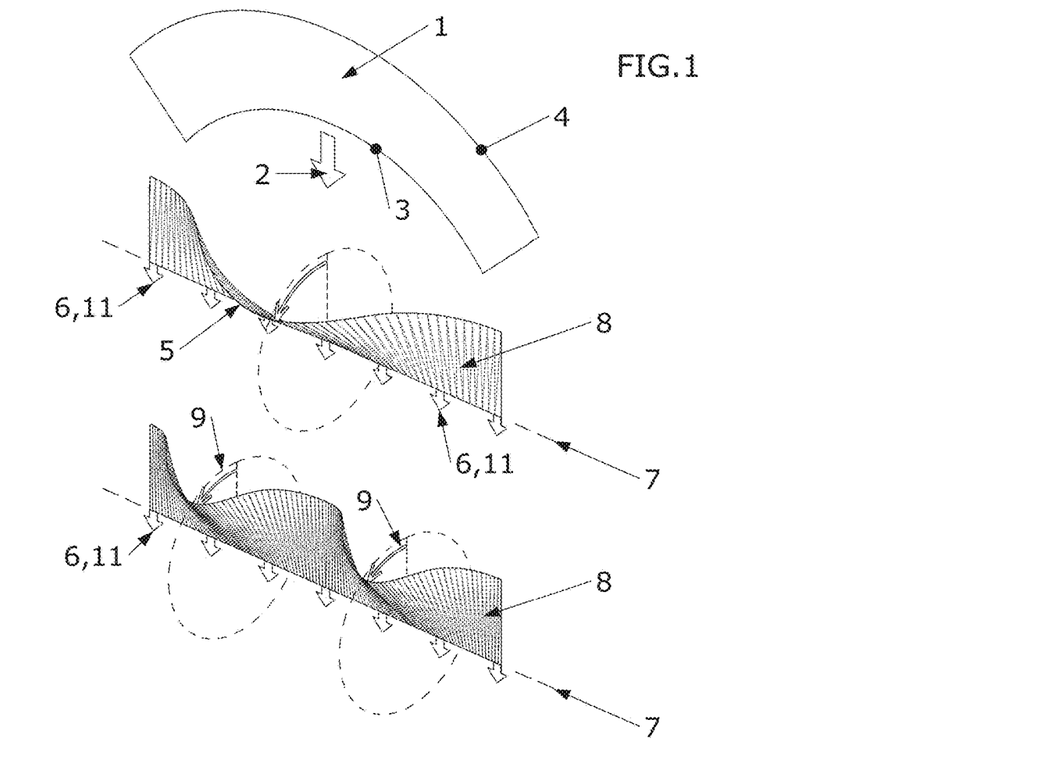
FIG. 1 illustrates the formation of a flexible fin with persistent strained deformation from the assembly process, and how the deformations translate into partial rotation of regions of the fin about the fin's longitudinal axis in one embodiment.
Figure 2:
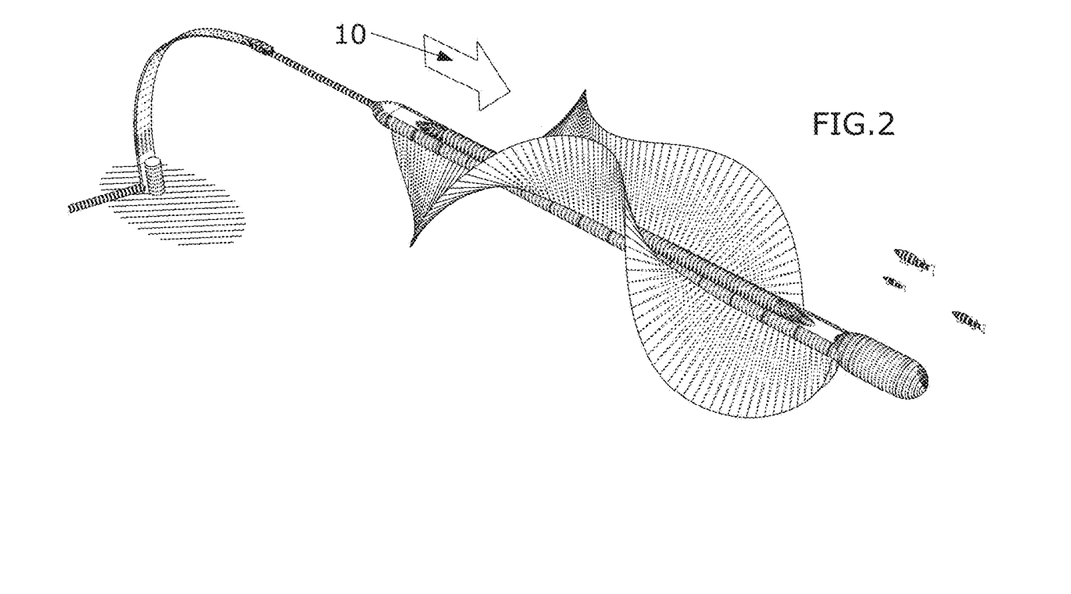
FIG. 2 illustrates a system embodiment with the fins coupled to a central core in a flow environment.

FIG. 1 illustrates an implementation of how an arched, flexible sheet-like material 1 with an inner edge radius 3 being smaller than an outer edge 4 radius may have a deforming force 2 applied so as to straighten the inner radius 3 of the arch relative to the outer radius 4 of the arch or forces 2, applied to create a strained, sinusoidal deformation 5, or deformations 5, and/or a hyperbolic geometry. Such hyperbolic geometry may also be created via tiling. When the strained state is maintained with loads 6 from a restraining element 11 on a longitudinal axis 7, a fin 8 may be created in which persistent deformations translate into rotations 9 of portions of the fin 8 relative to about the longitudinal axis 7. When fixed in a fluid flow 10, FIG. 2, hydrodynamic loads may cause the deformations 5 in the fins 8 to undulate and/or travel in the flow direction. The resulting powered, undulating mechanical action of the fins 8 may be coupled to a mechanism to perform useful work such as pumping, powering an electricity generator, and/or the like.

Figure 3:
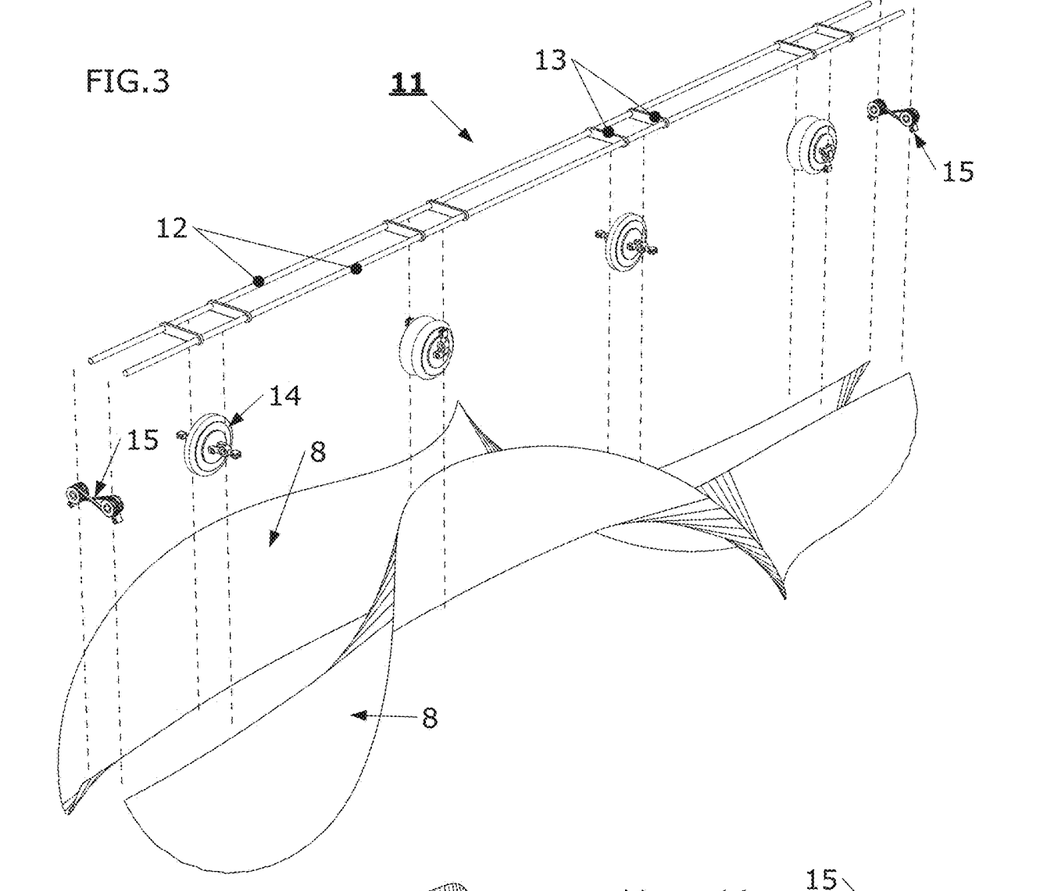
FIG. 3 illustrates components including fins, chassis, bellows or piston assemblies and fin-phase-enforcing assembly in one embodiment.
Figure 4:
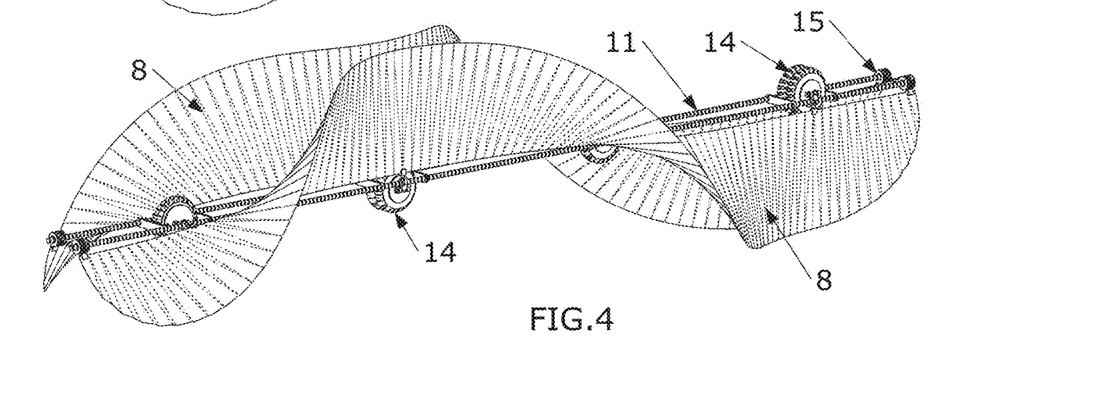
FIG. 4 illustrates the components of FIG. 3 assembled.

Embodiments disclosed herein include methods and mechanisms for harnessing the undulating mechanical action of the fins 8. In one embodiment, a common frame or chassis 11 that may be rigid or semi-rigid, may be comprised of two chassis rails 12 and at least one cross-bar 13, FIG. 3. In one implementation, the chassis 11 may serve as a restraining element that holds the loads 6 keeping the fins 8 in their persistently deformed state. At least one pump device (e.g., bellows, pistons, rotary vanes, and/or the like), e.g., bellows or piston assembly 14 may be coupled to the chassis 11. In one implementation, at least one fin-phase-enforcing assembly 15 may be coupled to the chassis 11. Two fins 8 may be coupled to the at least one bellows or piston assembly 14 and the at least one fin-phase-enforcing assembly 15, FIG. 4.

Figure 5:
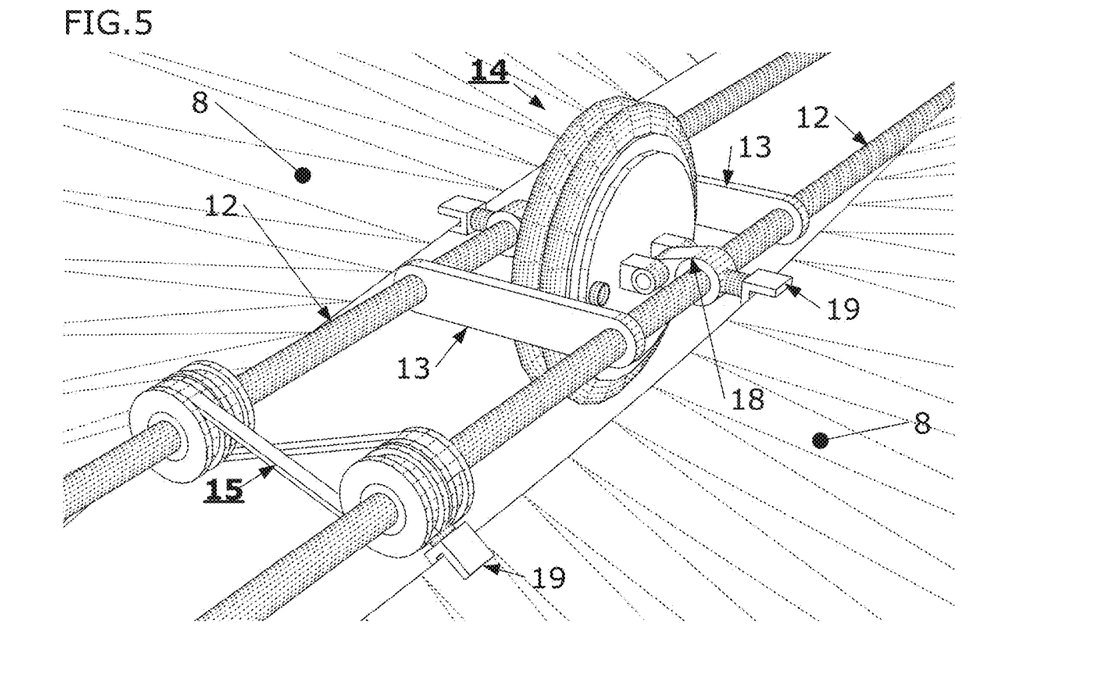
FIG. 5 illustrates how the bellows or piston assembly and fin-phase-enforcing assembly may be coupled to the chassis in one embodiment.

FIG. 5 illustrates one bellows or piston assembly 14, and one fin-phase-enforcing assembly 15, coupled to the chassis 11 and fins 8 in one embodiment. The fin-phase-enforcing assembly 15 maintains the rotation of the two fins 8 relative to each other, so that the rotation of one fin 8 is linked to the rotation of the other fin 8. The fin-phase-enforcing assembly 15 may, for example, be comprised of coupled timing belts, coupled gears, belts, chains and the like. The fin-phase-enforcing assembly 15 may, for example, keep the fins 8 one hundred and eighty degrees out of phase with each other, or mirroring each other about the central longitudinal axis of the chassis 11. This constraint on phasing between fins 8, under operation, facilitates the fins 8 exerting antagonistic loads onto bellows or piston assemblies 14, FIGS. 9-10.

Figure 6:
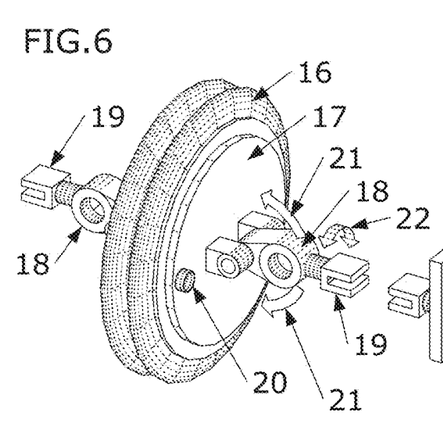
FIG. 6 illustrates one example of bellows or piston assembly.

FIG. 6 illustrates one bellows or piston assembly 14 in one embodiment, comprised of a bellows 16, bellows plate 17, lever arm 18 and fin-coupling fork 19 or other clamp and/or coupling component for fixing the fin 8 to the lever arm 18, and fluid inlet/outlet ports 20. In one implementation, the bellows or piston assembly 14 may have bilateral (left-right) symmetry so that components on one side are mirrored with components on the other side. For example, there may be a fluid inlet/outlet port 20 on either side of the bellows 16. The lever arms 18 may be rotationally-coupled to the chassis rails 12 and/or rotationally-coupled 21 to the bellows plate 17, FIGS. 5-6. The fin-coupling forks 19 may have one degree of rotational freedom 22.

Figure 7:
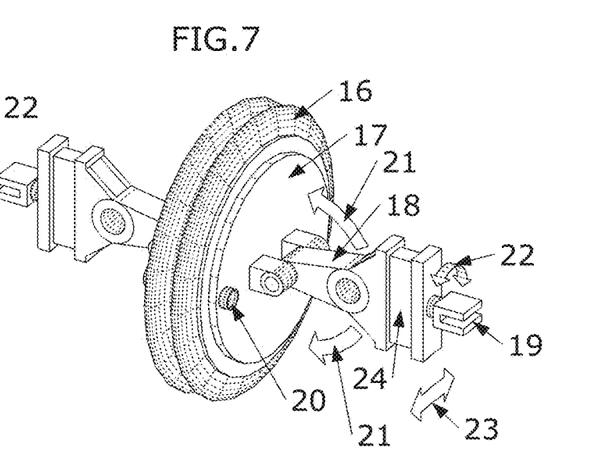
FIG. 7 illustrates another example of bellows or piston assembly.

FIG. 7 illustrates one bellows or piston assembly 14, in one embodiment, with an additional degree of freedom 23 between the lever arm 18 and the fin-coupling forks 19, via an intermediate member 24 that is flexible, allowing partial movement 23 of the fins 8 along their longitudinal axis 7 parallel to the longitudinal axis of the chassis rails 12.

Traveling wave undulations 5 along the fins 8, induced by ambient fluid 10 flowing across the fins 8 causes sequential rotation 9 of regions of the fins, FIG. 1. Since the wave undulations 5 of both fins 8 may be configured to be of opposite phase relative to each other, the fins' rotations 9 cause adjacent regions of the two fins 8 to be either moving away from each other or moving towards each other. Where a bellows or piston assembly 14 is coupled to the fins 8 (e.g., via fin coupling forks 19), fin rotation 9 at the coupling locations of the respective fins 8 may induce the lever arms 18 to either push against their respective bellows plates 17 or piston plates 25, or to pull away from their respective bellows plates 17 or piston plates 25. This synchronized pushing or pulling on the bellows plates 17 or piston plates 25 expands and contracts the volume of the bellows 16 or pistons 26, converting the hydrokinetic energy of the ambient flow 10 into fluid motion and pressure within the bellows 16 or pistons 26.

Figure 8:
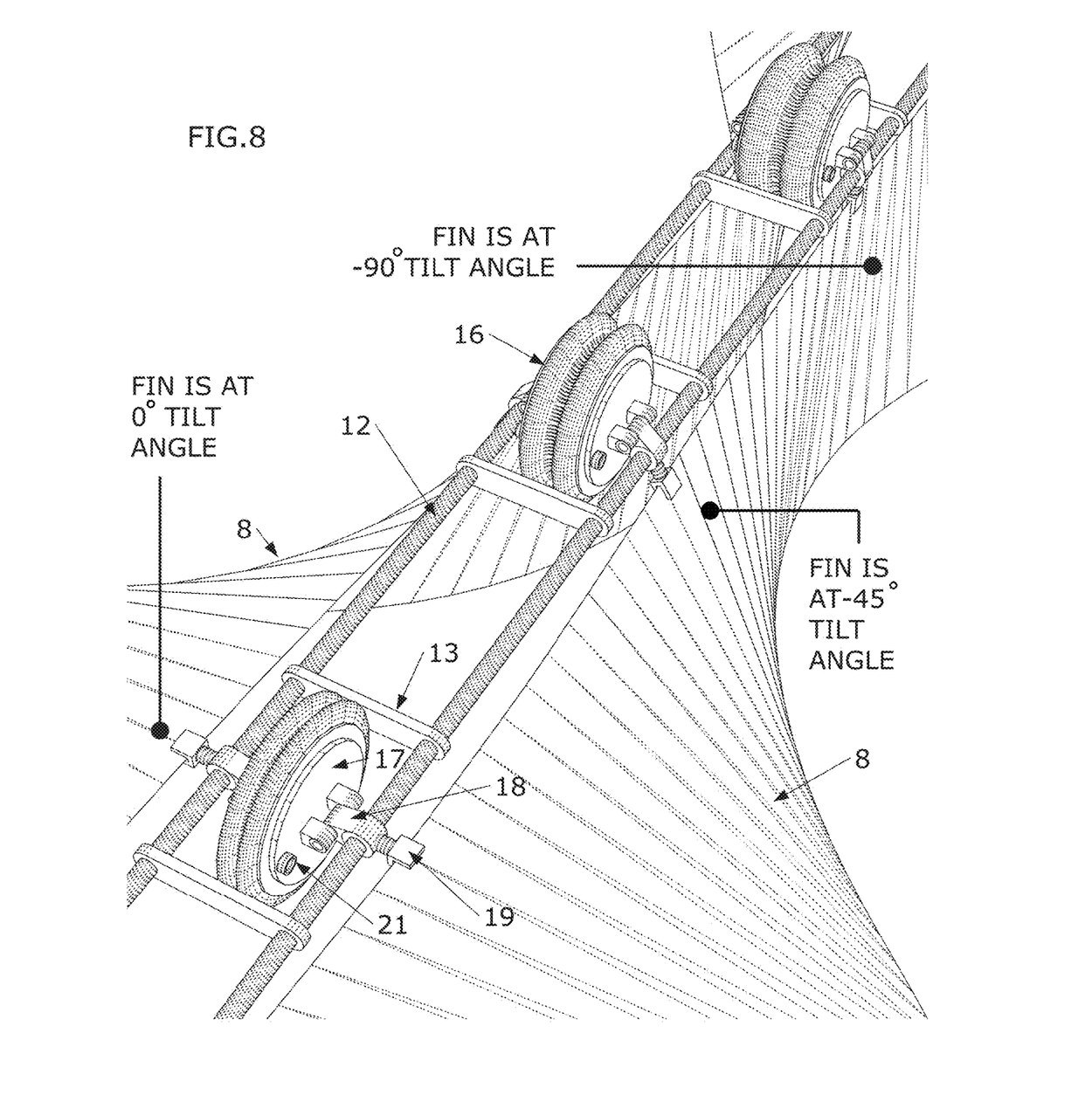
FIG. 8 illustrates the relationship between fin angle, lever arm angle and bellows or piston compression in one embodiment.

Fluid within the bellows 16 or piston 26 may enter or exit via fluid inlet/outlet ports 20 at either end of the bellows 16 or piston 26, which connect, e.g., to a circulatory system 27 of tubes or conduits. FIG. 8 illustrates how fin rotation angle 9 correlates with rotation of the lever arms 18, which in turn expands or contracts the bellows 16 or pistons 26. Each bellows or piston assembly 14 may be connected via tubes or conduits of the circulatory system 27 that may be flexible.

Figure 9:
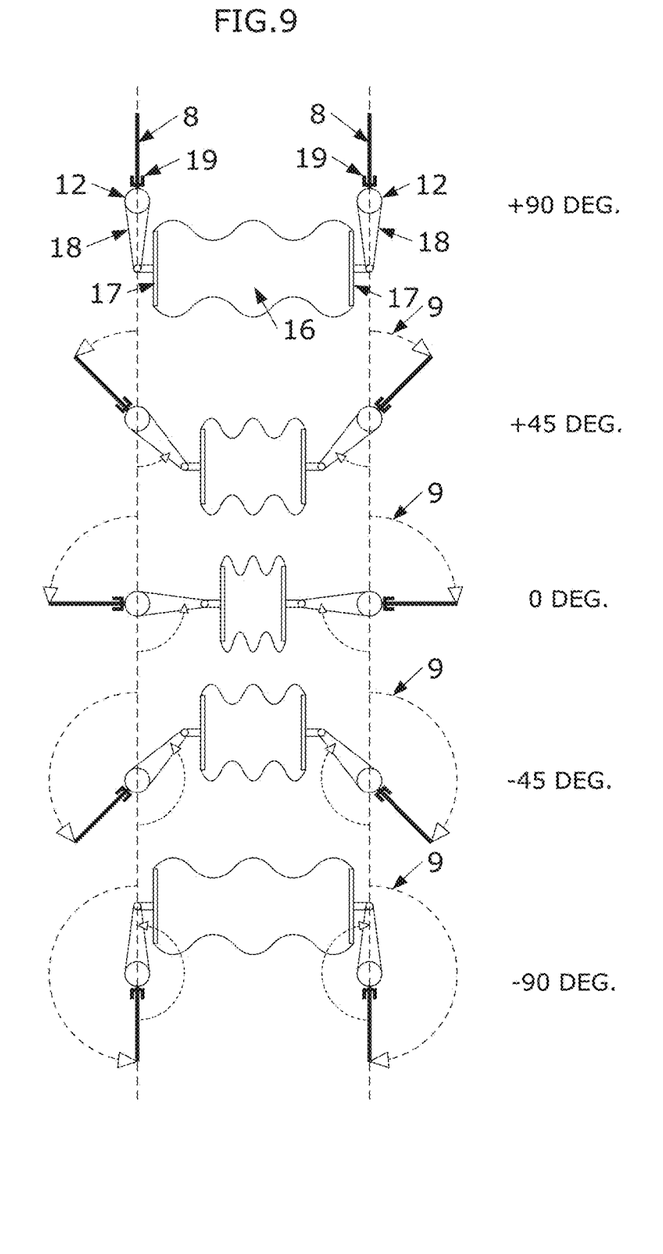
FIG. 9 illustrates how fin angle changes lever arm angle in a bellows implementation with a longer lever arm in one embodiment.
Figure 10:
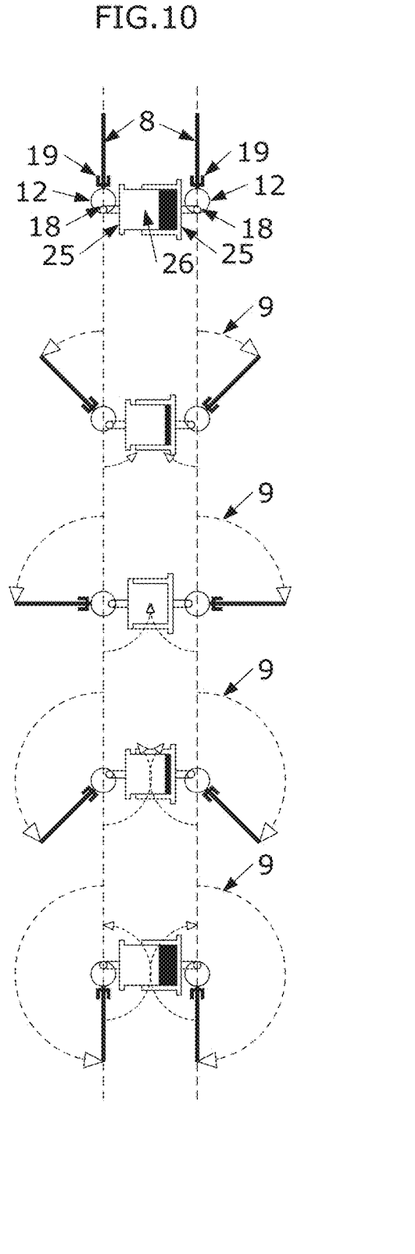
FIG. 10 illustrates how fin angle changes lever arm angle in a piston implementation with a shorter lever arm in one embodiment.

FIG. 9 is a diagram illustrating how the rotation 9 angles of the fins 8 may cause the bellows 16 to be compressed or expanded. FIG. 10 is a diagram illustrating how the rotation 9 angles of the fins 8 may cause the pistons 26 to be compressed or expanded. In one implementation, pistons 26 with a shorter lever arm 18 may be used, e.g., for higher-pressure, lower-volume fluid pumping. In another implementation, bellows 16 using a longer lever arm 18 may be used, e.g., for lower-pressure, higher volume pumping. FIGS. 8-10 omit the tubing or conduits of the circulatory system 27 for the purpose of visual clarity.

Figure 11:
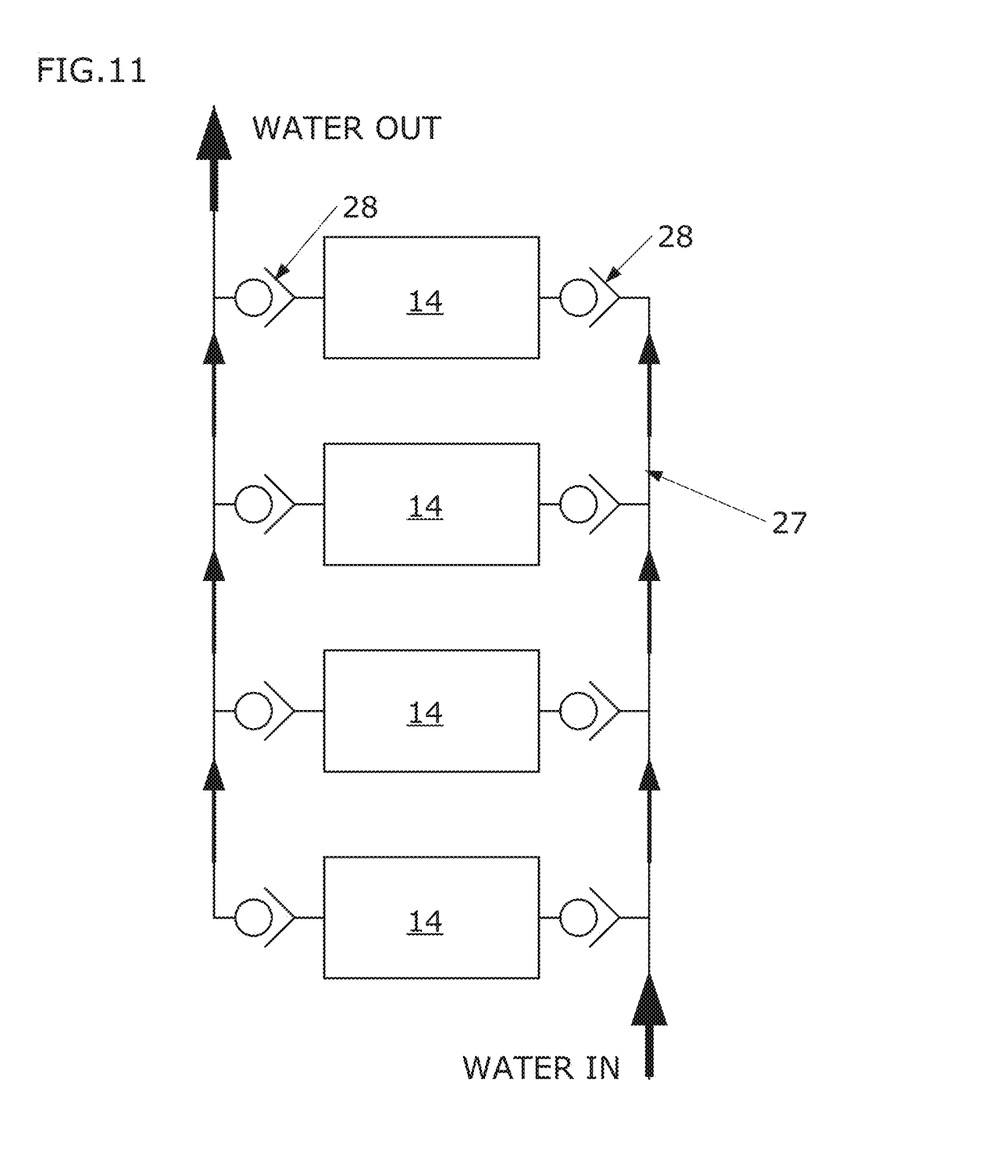
FIG. 11 illustrates a circulatory system for a pump implementation in one embodiment.

In one implementation, the tubes or conduits of the circulatory system 27 may form a circuit that is open-loop, FIG. 11, e.g., for pumping applications. In another implementation, the tubes or conduits of the circulatory system 27 may form a circuit that is closed-loop, FIG. 12, e.g., for electricity generation.

FIG. 11 is a diagrammatic illustration of an open-loop pumping circuit in one embodiment, where fluid is drawn into the tubing or conduits of the circulatory system 27 circuit at one end, and expelled at the other via at least one bellows or piston assembly 14. Check valves 28 are connected at the fluid inlet/outlet ports 20 on either side of the bellow 16 or piston 26 to maintain fluid flow in one direction.

Figure 12:
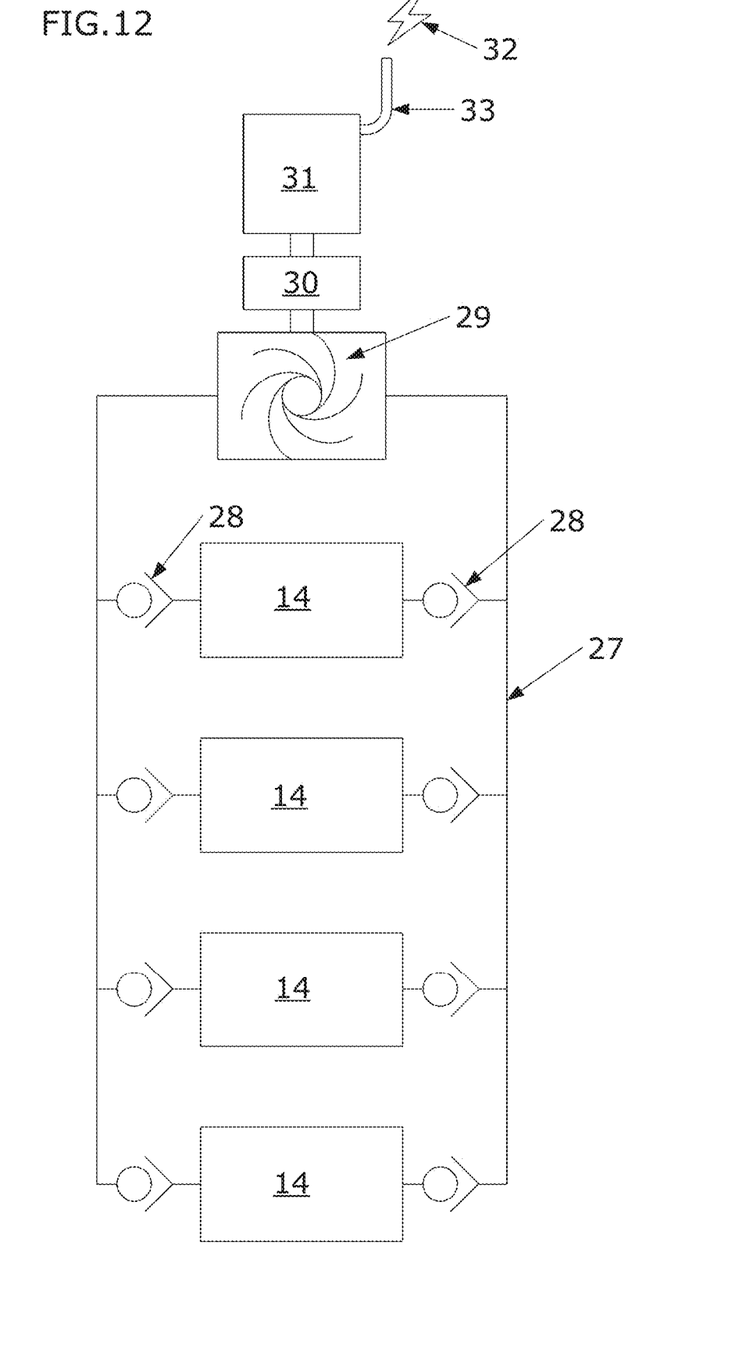
FIG. 12 illustrates a circulatory system for an electricity generating implementation in one embodiment.

FIG. 12 is a diagrammatic illustration of a closed-loop pumping circuit in one embodiment, with check valves 28 to maintain fluid-flow in one direction. A turbine 29 or other fluid transducer for converting fluid-flow and pressure into mechanical shaft power, may be placed into fluid communication with the circulatory system 27 to intercept the directional fluid-flow in the circuit. In one implementation, the turbine may be coupled to a gearbox 30 which may be coupled to an electromagnetic generator 31 to generate electricity 32. In one implementation, a cable 33 (e.g., an insulated cable) may connect the generator to electric equipment, a battery, an electricity grid, and/or the like.

Figure 13:
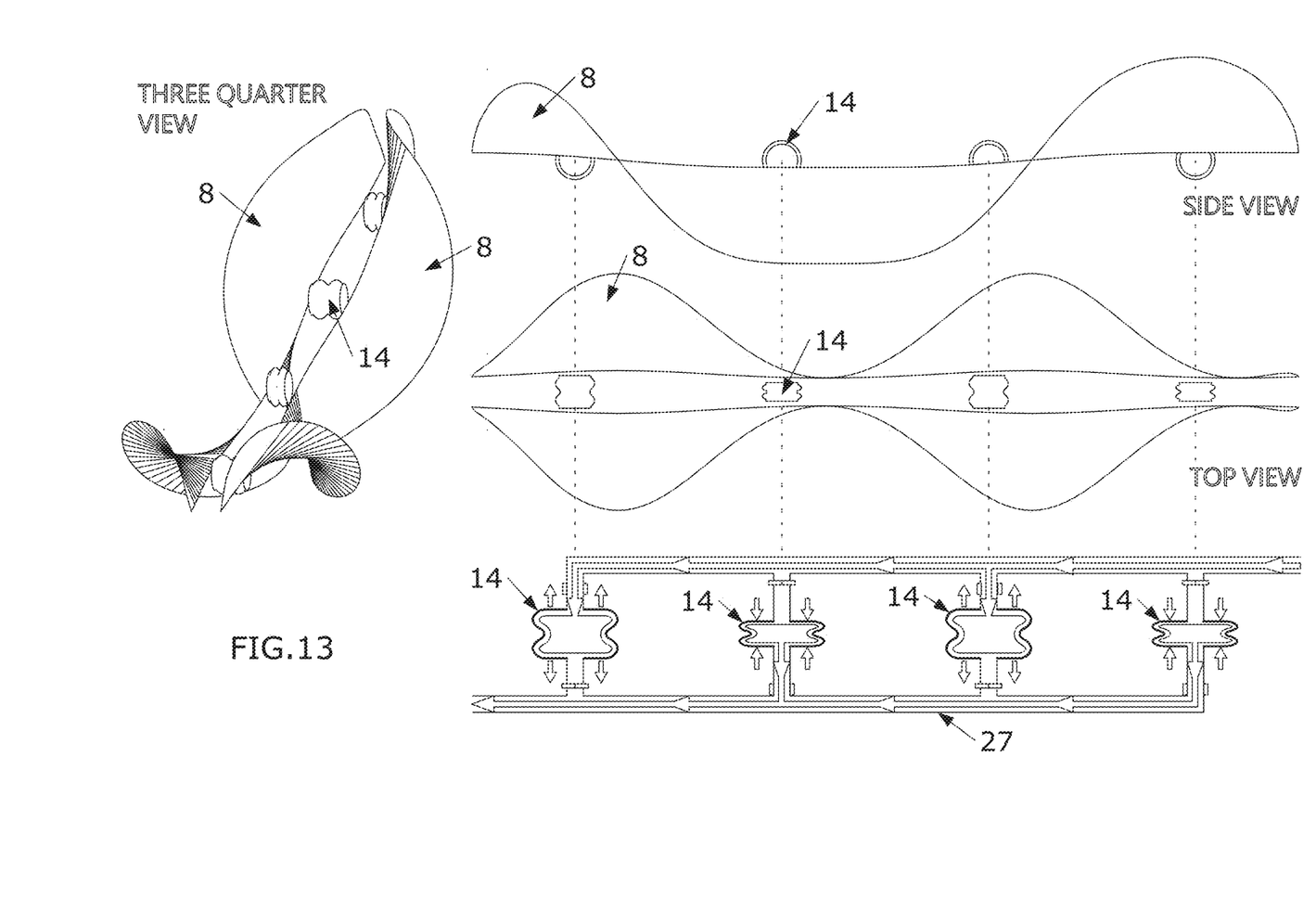
FIG. 13 illustrates three schematic views of a pump implementation and a flow diagram of the circulatory system in one embodiment.

FIG. 13 illustrates schematic three-quarter view, side view and top view of a pump mechanism, and a corresponding circulatory system 27 diagram of a pump mechanism in one embodiment.

Figure 14:
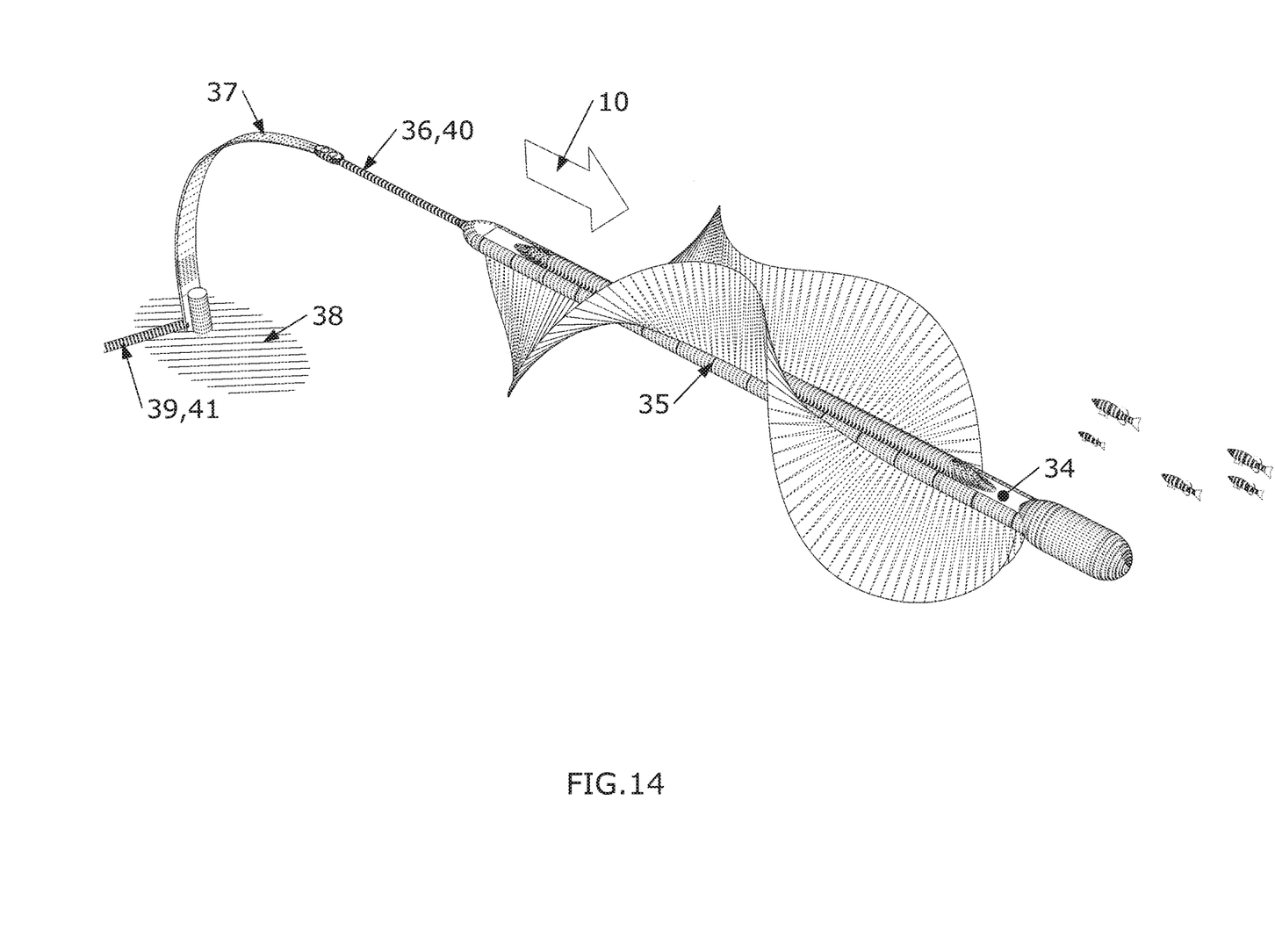
FIG. 14 illustrates a pump or generator implementation fixed in a flowing water source in one embodiment.

FIG. 14 illustrates a pump or a generator implementation, where the tubing or conduits of the circulatory system 27, bellows or piston assemblies 14 and other components are enclosed in a cowling 34. In one implementation, the cowling may include slotted openings 35 to allow the fin coupling forks 19 to connect to the fins 8. For pump implementations, pumped fluid leaving the conduit's circulatory system 27 may exit via an exit tube or conduit 36 that may be flexible, and may pass through a flexible mast 37 that is secured to a fixed substrate 38 such as a river bed, bridge pier or other immovable object. In some implementations, flexible mast 37 may be secured to floating and/or mobile substrates, such as a vehicle side. The pumped fluid may be transferred via another conduit 39 to shore, to a container or other destination. For generator implementations, electricity 33 may exit the system via a wire 32 along a conduit 40, and may pass along or through the flexible mast 37 and along another conduit 41 to equipment, a battery, to the shore and/or to another destination such as an electricity grid.

Figure 15:
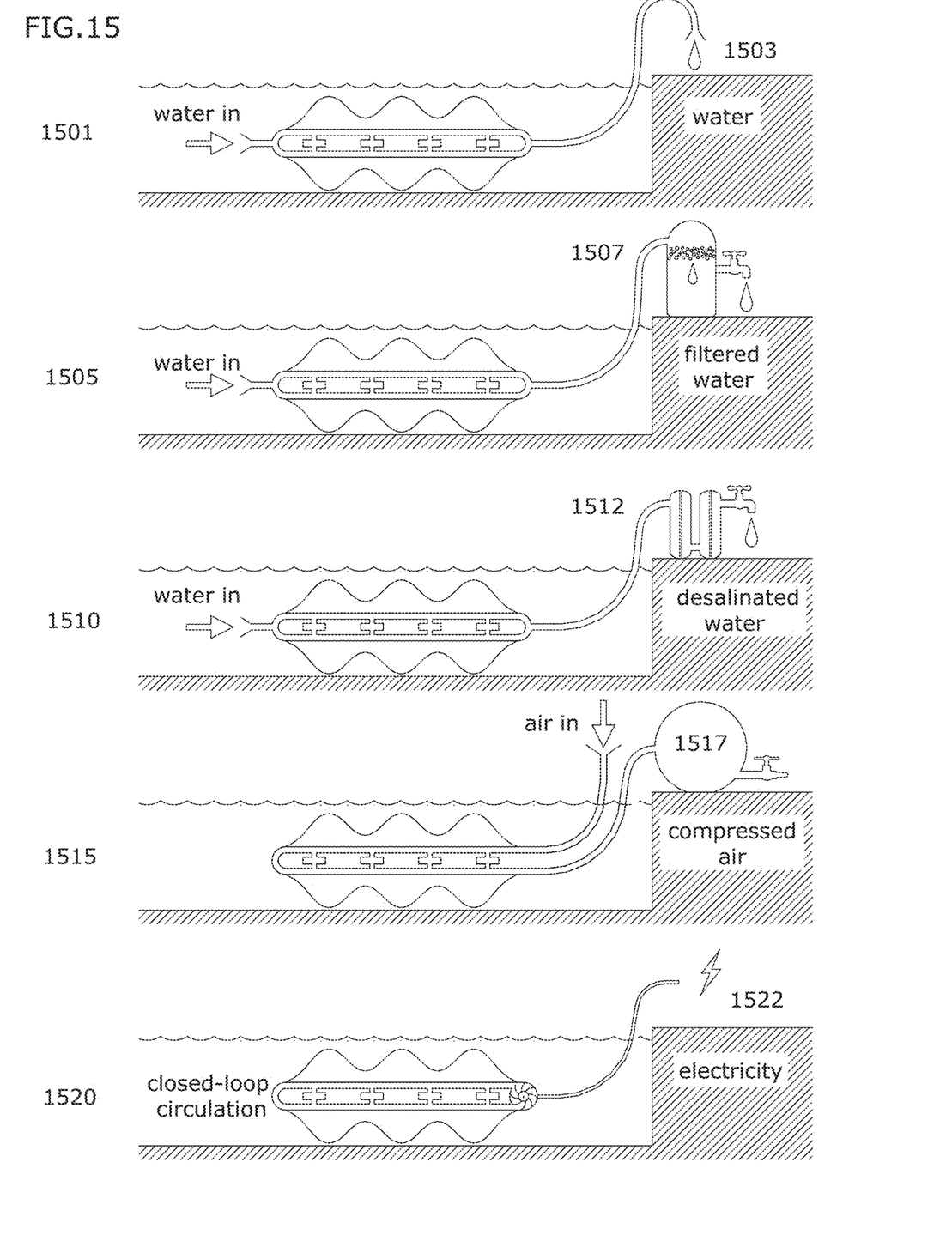
FIG. 15 illustrates implementations for water pumping, water filtration, desalination, air compression and electricity generation in various embodiments.

FIG. 15 illustrates various implementations of the present invention for water pumping 1501 (e.g., directly to a receptacle, water distribution system, and/or the like 1503), water filtration 1505 (e.g., via a filter, purification system, and/or the like 1507), desalination 1510 (e.g., via a desalination and/or distillation device and/or facility 1512), air compression 1515 (e.g., via a compressor, pump, compressed air storage facility, and/or the like 1517), and electricity generation 1520 (e.g., to equipment, a battery, to the shore and/or to another destination such as an electricity grid 1522).

In order to address various issues and advance the art, the entirety of this application for APPARATUSES, METHODS AND SYSTEMS FOR HARNESSING THE ENERGY OF FLUID FLOW TO GENERATE ELECTRICITY OR PUMP FLUID (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any process steps and/or feature sets as described in the figures and/or throughout are not limited to a fixed operating order and/or arrangement, but rather, any disclosed order is exemplary and all equivalents, regardless of order, are contemplated by the disclosure. Similarly, some features are applicable to one aspect of the innovations, and inapplicable to others. In addition, the disclosure includes multiple innovations including some that may not be presently claimed, and the Applicant reserves all rights in those presently unclaimed innovations including the right to claim such innovations, file additional applications, continuations, continuations in part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. A mechanism, comprising:
   a pump device having a left side and a right side;
   a first articulated coupling component rotationally coupled at a first end to the left side of the pump device and rotationally coupled at a second end to a common frame;
   a second articulated coupling component rotationally coupled at a first end to the right side of the pump device and rotationally coupled at a second end to the common frame;
   a first flexible fin connected at an inner first edge to the second end of the first articulated coupling component;
   a second flexible fin connected at an inner second edge to the second end of the second articulated coupling component; and
   a conduit in fluid communication with the pump device, wherein oscillations of the first and second flexible fins caused by a flowing fluid induce expansion and contraction of the pump device to pump fluid in the conduit.

2. The mechanism of claim 1, wherein the first flexible fin is connected to the first articulated coupling component by a first clamp, and the second flexible fin is connected to the second articulated coupling component by a second clamp.

3. The mechanism of claim 1, wherein the first and second flexible fins comprise first and second crenated strips having persistent deformations maintained by the common frame, and wherein the flowing fluid induces undulations of the persistent deformations.

4. The mechanism of claim 1, wherein the expansion of the pump device corresponds to an adjacent portion of the first and second flexible fins forming an angle with an axis connecting the left side and the right side of the pump device of near 90 degrees and the contraction of the pump device corresponds to the adjacent portion of the first and second flexible fins forming an angle with the axis connecting the left side and the right side of the pump device of near 180 degrees.

5. The mechanism of claim 1, further comprising:
   at least one check valve configured to restrict a direction of the pumped fluid in the conduit.

6. The mechanism of claim 5, wherein the at least one check valve comprises a first check valve adjacent to the left side of the pump device and a second check valve adjacent to the right side of the pump device.

7. The mechanism of claim 1, wherein the conduit comprises a hydraulic hose.

8. The mechanism of claim 1, further comprising:
a turbine connected to the conduit, wherein the pumped fluid induces a torque load on the turbine.

9. The mechanism of claim 8, further comprising:
a generator coupled to the turbine and configured to convert rotation of the turbine in response to the torque load into electricity.

10. The mechanism of claim 9, further comprising:
a gear box inserted between an output shaft of the turbine and an input shaft of the generator.

11. The mechanism of claim 9, further comprising:
an insulated cable configured to conduct the electricity from the generator to at least one energy recipient.

12. The mechanism of claim 11, wherein the at least one energy recipient is a battery.

13. The mechanism of claim 11, wherein the at least one energy recipient is a power grid.

14. The mechanism of claim 1, further comprising:
a tether connecting the common frame to a substrate.

15. The mechanism of claim 14, further comprising:
a flexible mast connected at one end to the substrate and at another end to the tether.

16. The mechanism of claim 1, further comprising:
a cowling enclosing the common frame, the cowling having slots to facilitate connection of the first and second flexible fins to the first and second articulated coupling components respectively.

17. The mechanism of claim 16, further comprising:
a turbine connected to the conduit, wherein the pumped fluid induces a torque load on the turbine; and
a generator coupled to the turbine and configured to convert rotation of the turbine in response the torque load into electricity,
wherein the turbine and generator are housed at a downstream end of the cowling.

18. The mechanism of claim 1, wherein the flowing fluid and the pumped fluid are both of a common fluid source.

19. The mechanism of claim 1, wherein the pump device comprises a bellows.

20. The mechanism of claim 1, wherein the pump device comprises a piston.

21. The mechanism of claim 1, wherein the pump device comprises a rotary vane.

22. The mechanism of claim 1, further comprising at least one fin-phase-enforcing assembly.

23. The mechanism of claim 22, wherein the fin-phase-enforcing assembly comprises at least one of coupled timing belts and coupled gears.

24. The mechanism of claim 1, wherein the first and second articulated coupling components are coupled to the common frame via respective first and second flexible intermediate members.

25. The mechanism of claim 1, wherein the conduit is an open-loop conduit.

26. The mechanism of claim 1, wherein the conduit is a closed-loop conduit.

27. A mechanism, comprising:
a plurality of pump devices arranged between arms of a common frame, each having a left side and a right side;
a plurality of first articulated coupling components, each rotationally coupled at a first end to the left side of one of the plurality of pump devices and rotationally coupled at a second end to a left arm of the common frame;
a plurality of second articulated coupling components, each rotationally coupled at a first end to the right side of one of the plurality of pump devices and rotationally coupled at a second end to a right arm of the common frame;
a first crenated strip connected at an inner first edge to the second end of each of the plurality of first articulated coupling components;
a second crenated strip connected at an inner second edge to the second end of each of the plurality of second articulated coupling components;
a hydraulic hose in fluid communication with the plurality of pump devices, wherein each of the first and second crenated strips have persistent deformations therein maintained by the common frame and wherein oscillations of the persistent deformations of the first and second crenated strips caused by a flowing fluid induce expansion and contraction of the plurality of pump devices to pump fluid in the hydraulic hose;
a plurality of left and right check valves, each left check valve adjacent to a left side of one of the plurality of pump devices and each right check valve adjacent to a right side of one of the plurality of pump devices, the plurality of left and right check valves configured to restrict a direction of the pumped fluid in the hydraulic hose;
a turbine connected to the hydraulic hose, wherein the pumped fluid induces a torque load on the turbine;
a generator coupled to the turbine and configured to convert rotation of the turbine in response to the torque load into electricity; and
a gear box inserted between an output shaft of the turbine and an input shaft of the generator.

28. The mechanism of claim 27, wherein the plurality of pump devices comprise bellows.

29. The mechanism of claim 27, wherein the plurality of pump devices comprise pistons.

30. The mechanism of claim 27, wherein the plurality of pump devices comprise rotary vanes.

31. The mechanism of claim 27, further comprising at least one fin-phase-enforcing assembly.

32. The mechanism of claim 31, wherein the fin-phase-enforcing assembly comprises at least one of coupled timing belts and coupled gears.

33. A method, comprising:
placing a pump device having a left side and a right side between left and right arms of a common frame;
rotationally coupling a first articulated component at a first end to the left side of the pump device;
rotationally coupling the first articulated component at a second end to the left arm of the common frame;
rotationally coupling a second articulated component at a first end to the right side of the pump device;
rotationally coupling the second articulated component at a second end to the right arm of the common frame;
connecting a first flexible fin at an inner first edge to the second end of the first articulated coupling component;
connecting a second flexible fin at an inner second edge to the second end of the second articulated coupling component; and
connecting a conduit in fluid communication with the pump device, wherein oscillations of the first and second flexible fins caused by a flowing fluid induce expansion and contraction of the pump device to pump fluid in the conduit.

* * * * *